United States Patent
Cripe

[15] 3,686,861
[45] Aug. 29, 1972

[54] ELECTRICAL CONTROL FOR VACUUM PUMP

[72] Inventor: Maxwell L. Cripe, South Bend, Ind.
[73] Assignee: The Bendix Corporation
[22] Filed: March 19, 1971
[21] Appl. No.: 125,978

[52] U.S. Cl. ..................60/51, 60/54.5 P, 60/60, 60/54.5 E
[51] Int. Cl. ..................................F15b 1/02
[58] Field of Search ............60/51, 54.5 P, 54.5 E, 60

[56] References Cited

UNITED STATES PATENTS

| | | | |
|---|---|---|---|
| 2,293,542 | 8/1942 | Hamilton | 60/60 X |
| 2,323,519 | 7/1943 | Dean | 60/60 UX |
| 2,705,870 | 4/1955 | Holton | 60/60 UX |

Primary Examiner—Edgar W. Geoghegan
Attorney—Leo H. McCormick, Jr. and Plante, Hartz, Smith and Thompson

[57] ABSTRACT

An electrical control for operating a vacuum powered pumping device which supplies fluid under pressure to operate a spring braking device. A pressure operating signal is communicated to the electrical control and an indicator to inform the operator of the operational pressure mode in the supply system. If a low pressure mode signal is generated, a temperature responsive switch sequentially interrupts the electrical energy flow to the electrical control. By interrupting the electrical energy flow to the electrical control, the pumping device will reciprocate and increase the pressure in the system causing the pressure mode signal to change. With a change in the pressure mode signal indicating a higher pressure, the electrical energy flow to the control will be terminated.

10 Claims, 1 Drawing Figure

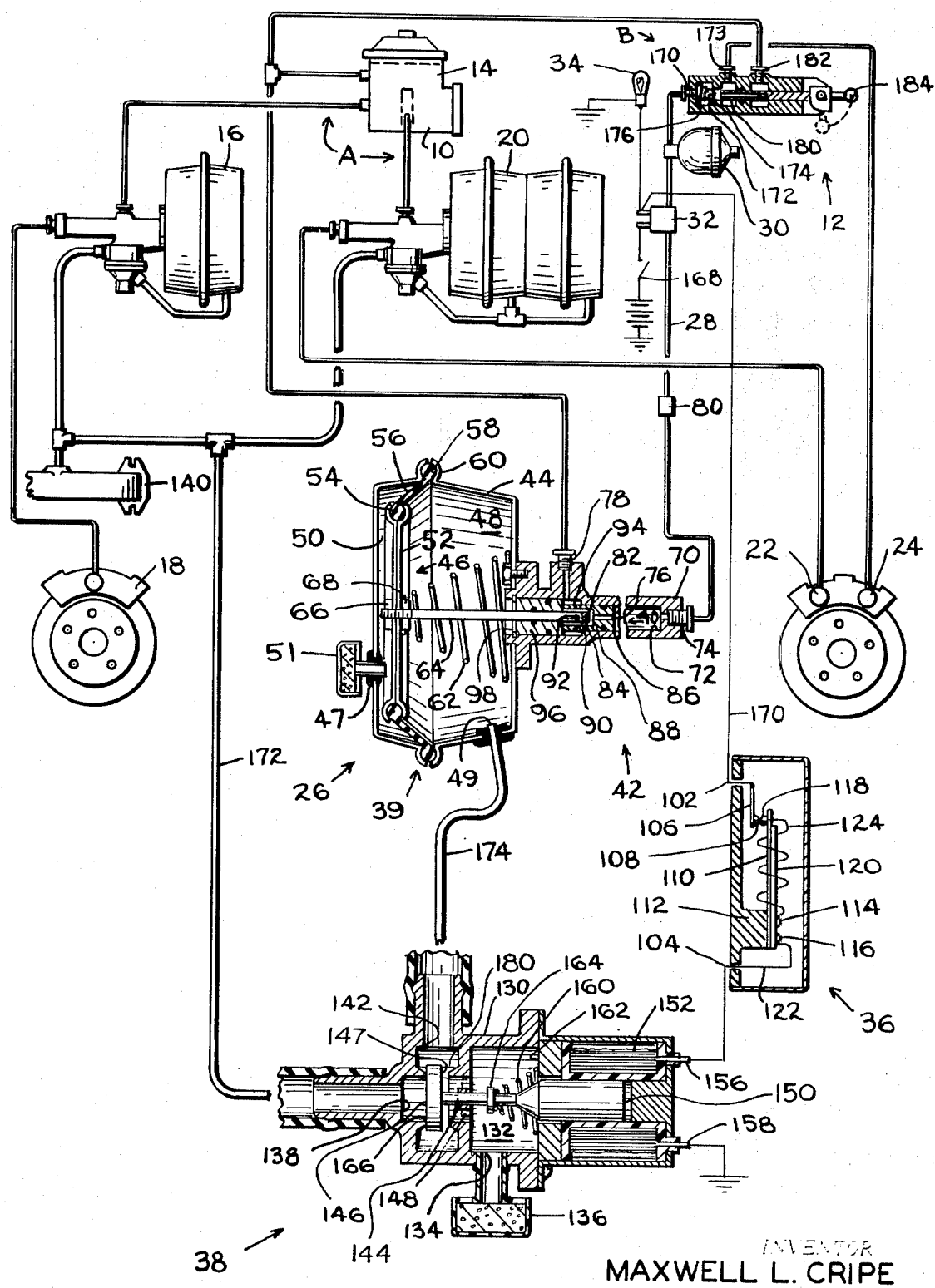
PATENTED AUG 29 1972
3,686,861
INVENTOR
MAXWELL L. CRIPE
ATTORNEY

ELECTRICAL CONTROL FOR VACUUM PUMP

BACKGROUND OF THE INVENTION

Spring brakes have been proposed as one part of the dual braking systems required by the Federal Highway's Safety Laws. Initially, the spring brake was operated by an inversion valve connected to the same source of pressurized fluid used to operate the entire braking system. If, for some reason the source of pressurized fluid was lost, the spring brakes were automatically applied, as disclosed in copending U.S. application Ser. No. 797,530, filed Feb. 7, 1969, now U.S. Pat. No. 3,599,761 owned by the same assignee and incorporated by reference. Later as disclosed in copending U.S. application Ser. No. 28,843, filed Apr. 15, 1970, now U.S. Pat. No. 3,617,097, owned by the same assignee and incorporated by reference, a split full power system having an inversion valve capable of being modulated was developed to control the actuation of the spring brakes. In these split systems a pump driven by the crankshaft supplied the fluid under pressure to operate the spring brakes. Unfortunately, in modern automobiles the equipment driven by the crankshaft is ever increasing, i.e., air conditioning, power steering, fuel pump etc., with a resulting smaller crankshaft power output. In addition, the available power output has been further reduced partially by the use of unleaded gas to reduce pollution and the available engine space under the hood.

With further development it was discovered that a vacuum driven pump could be operated to supply the necessary fluid under pressure to operate the spring brakes. A pressure indicator in the supply line to the spring brakes would inform the operator of the pressure mode available to operate the spring brakes. In U.S. application Ser. No. 126,020, filed Mar. 19, 1971, owned by the common assignee of this invention and incorporated by reference if a low pressure mode was indicated by the signal generated, the operator manually modulated a control valve to operate the vacuum driven pump to build up the pressure of the fluid in the supply line. But since this operation requires an overt act on the part of the operator, the pressure differential controlled vacuum pump, as disclosed in application Ser. No. 91,641, filed Nov. 23, 1970 owned by the common assignee of this invention and incorporated herein by reference, was developed. The force created by the pressure differential across a movable wall is continually compared with the force required to move a piston in the pump which pressurizes the fluid going to the supply line. However, as shown by the pressure indicator, the vacuum pump need only be operational during periods when a low pressure mode exists in the supply system.

SUMMARY OF THE INVENTION

It has been observed that as long as internal combustion engines are running, vacuum will be produced at the intake manifold. The intensity of the vacuum will normally be the greatest when the accelerator pedal is released, as during periods of braking. This is because the intake air to the carburetor is restricted while the piston displacement is constant.

In order to conserve crankshaft power, I have devised a braking system powered by a vacuum driven pump for supplying high pressure fluid to operate the auxiliary spring brakes. The vacuum driven pumping device has a housing whose interior is divided by a diaphragm. A piston is secured to a push rod to pressurize fluid in the supply line in response to movement by the diaphragm. One side of the diaphragm of the pumping device is maintained under atmospheric pressure while vacuum and atmospheric pressure are alternately communicated to the other side of the diaphragm by an electrically operated control valve. Through this alternate communication a pressure differential will be created across the diaphragm which will cause the piston to reciprocate. The piston will automatically reciprocate to pressurize fluid communicated by a conduit to an accumulator until a signal representing a predetermined pressure mode interrupts the flow of electricity to a temperature responsive switch which alternatively energizes the electrical control valve. A check valve in the conduit will prevent backflow of the fluid transmitted to the accumulator. At the bottom of the power stroke atmospheric pressure will be supplied to both sides of the diaphragm to permit a spring acting on the diaphragm to move the piston to the top of the power stroke. In this position upon energizing the electrical control valve, vacuum will evacuate the front chamber to create the operational pressure differential. A manually operated inversion valve has an inlet attached to the accumulator which normally permits fluid pressure to pass to the spring brakes through a control port. When an operator desires to activate the spring brakes, the inversion valve is moved to inhibit the flow of fluid from the inlet while permitting fluid flow from the control port through an outlet to a reservoir operatively connected to the inlet port of the pumping piston. During periods that a low pressure mode exists in the supply conduit, a signal will be transmitted to an indicator to alert the operator of this condition.

It is therefore an object of this invention to provide a power braking system with an electrically controlled vacuum pumping means for operating a spring brake means.

It is another object of this invention to provide an auxiliary braking system with operational means without utilizing the power created by the crankshaft.

It is another object of this invention to provide an auxiliary braking system with an electrical valve means controlled by a signal generated by a temperature switching means acting on a pressure mode signal.

It is still a further object of my invention to provide an auxiliary braking system with means to assure a constant source of high pressure to operate a spring brake means.

These and other objects of my invention will become apparent from reading the specification and viewing the drawing.

BRIEF DESCRIPTION OF THE DRAWING

In the drawing an enlarged sectional view of an electrical control valve for operating a vacuum pump which supplied fluid pressure to operate a part of a dual braking system is shown.

DETAILED DESCRIPTION OF THE PREFERRED EMBODIMENT

In the drawing there is represented a dual full power braking system with the main system A being responsive to the split master cylinder 10 and the auxiliary system B being responsive to the inversion valve 12. Each system is operated independently of the other even though a common reservoir 14 in the master cylinder 10 is used to supply the same type of fluid to both systems.

In the main braking system A, in response to the application of a brake pedal (not shown) a piston (not shown) in the split master cylinder 10 will simultaneously transmit a pressure signal to the front power brake servomotor 16, of a type which operates in a manner fully described in U. S. Pat. No. 3,108,615 owned by the common assignee of the application and incorporated herein by reference, to operate the front service brakes 18 (only one of which is shown) and to the rear tandem power brake servomotor 20, which operates in the same manner as the front power brake servomotor 16, for operating the rear service brake 22, (only one of which is shown) in a manner fully described in copending U. S. application Ser. No. 797,530, filed Feb. 7, 1969, now U. S. Pat. No. 3,599,761 incorporated herein by reference.

In the braking auxiliary system B used for emergency and parking, an inversion valve 12, of a type disclosed in copending U. S. application Ser. No. 28,843 filed Apr. 15, 1970, now U. S. Pat. No. 3,617,097, incorporated by reference above, controls fluid pressure being supplied to a spring brake 24 operating in a manner fully described in U. S. application Ser. No. 797,530 filed Feb. 7, 1969, now U. S. Pat. No. 3,599,761, and incorporated herein by reference. A vacuum pumping device 26, operatively connected by conduit 28 to accumulator 30 will pressurized fluid received from reservoir 14. Through the accumulator 30 the fluid pressure acting on the spring brake 24 will be maintained within relatively constant range. A switch 32, of a type fully described in U. S. application Ser. No. 784,775 filed Dec. 18, 1968, now U. S. Pat. No. 3,593,265, owned by the same common assignee of this application and incorporated herein by reference, is located in conduit 28 adjacent the accumulator 30. Switch 32 has an internal movable shaft (not shown) which is responsive to the fluid pressure in the conduit. If a low pressure is present in the conduit 28, the shaft will move to close an electrical contact switch which will cause a signal to be sent to an indicator device 34, either a warning light (as shown), which continually glows or flashes or an audible signal (not shown), to be energized for alerting an operator of this pressure mode condition. Electrical energy representative of this signal indicating an existing pressure mode will flow to a temperature responsive switching means 36 which will sequentially interrupt the continued flow to an electrically operated control valve means 38. The control valve means 38 will periodically be energized by the electrical energy flow causing the vacuum pumping device 26 to pressurize the operational fluid in the supply conduit 28.

In more particular detail the vacuum operated pumping device 26 consists of a power transmitting chamber 39 and a fluid intensifying chamber 42 connected to the spring brake means 24.

The power transmitting chamber 39 has a housing 44 with an internal cavity. A wall of diaphragm means 46 has a first bead 58 held by an annular rib 60 in the housing and a second bead 54 held to a stiff internal two piece plate 52 which is clamped together to divide the cavity into a front chamber 48 and a rear chamber 50. The front chamber has an opening 49 through which the electrically operated control valve means alternatively ports vacuum and atmospheric pressure while the rear chamber 50 has an opening 47 covered by filter 51 through which atmospheric pressure flows unrestricted into the rear chamber 50. A flexible portion 56 located between the first and second beads 58 and 54 will permit the wall or diaphragm means 46 to be freely moved axially within the cavity. A resilient member 62 is concentrically located on plate 52 to surround a push rod 64 attached to plate 52. A pair of nuts 66 and 68 are threaded on the push rod 64 in such a manner as to hold the two piece plate 52 together. The push rod 64 extends through the housing 44 into the intensifying chamber 42 to transmit any force created by movement of the diaphragm member 46 caused by a pressure differential between the front chamber and the rear chamber to be communicated thereinto.

The fluid intensifying chamber 42 has a cylindrical body 70 with an axially extending chamber 72 from which fluid is forced through outlet 74 by displacement piston means 40 attached to push rod 64. To replace the loss of fluid in chamber 72 displaced by piston means 40 moving to the right to transmit pressurized fluid to the accumulator 30, a compensating port 76 is connected to inlet port 78 in communication with reservoir 14. The change in volume of fluid in chamber 72 occurs because check valve 80 prevents the back flow of fluid as the piston means 40 returns to the left to the top of the power stroke. During power activation, the compensation port 76 is closed by a poppet member 82 retained in an enlarged section 84 of the piston 86 seating on shoulder 88. The push rod 64 to which poppet member 82 is attached, projects into the enlarged section 84 and is loosely fastened to the piston 86 by cross pin 90. The cross pin 90 is fixed to the push rod 64 but moves in a slotted section 92 on the piston 86. The length of the slotted section 92 is designed to permit the poppet member 82 to be unseated when the pin engages the rear end of the slot and seated on shoulder 88 at the front end of the slot. The cross pin 92 is prevented from coming loose by a snap ring 94 positioned in a groove on the outer surface of the piston 86 overlying the ends of cross pin 92. A guide bearing 96, retained by a snap ring 98, maintains push rod 64 in alignment with the intensifying chamber 42 and prevents any fluid from entering into the front chamber 48.

The temperature responsive switching means 36 consists of a housing 100 having a first terminal 102 connected to the pressure responsive switch 32 and a second terminal 104 connected to the electrically operated control valve means 38. The first terminal 102 has a contact strip 106 ending in a contact point 108. A first strip of metal 110 having one end fixed to a non-conductive projection 112 on the housing 100 by a pair of pins 114 and 116 has a contact point 118 which is adjacent contact pin 108. A second strip of metal 120 having a different coefficient of expansion than the first strip is fixed to the first strip 110. The and second strips of metal bias the contact point 118 into contact 108 to close the circuit between pin 116 and first terminal 102. A heating wire 124 which is attached to the first strip of metal adjacent contact 118 coils around the first and second metal strips until it is connected to pin 114. A contact strip 122 connected to pin 116 and the second terminal 104 will complete the electrical circuit through the switching means 36.

The electrically operated control valve means 38 consists of a housing 130 having an internal chamber 132 with an inlet port 134 connected to atmospheric pressure through filter 136, an outlet port 138 connected to the manifold 140 of an internal combustion engine and a control port 142 connected to the front chamber 48 of the pumping device 26.

A plunger 144 having one end with an annular face 146 which is located adjacent the outlet port 138 and another end 150 surrounded by a coil 152 is held in chamber 132 by a spidered bearing surface 148. The coil 152 receives electrical energy from the second terminal 104 through contact 156 and is grounded at 158. A resilient member 160 is caged between the wall 162 and a keeper 164 on the plunger shaft to urge face 146 into seating on ribs 166 to close the communication through the outlet port 138.

MODE OF OPERATION OF THE PREFERRED EMBODIMENT

After turning on ignition switch 168 shown in the drawing, if low pressure exists in the accumulator 30 and it is insufficient to release the spring brakes, a pressure mode signal will be indicated through light 34. This will alert the operator not to try to attempt to move the vehicle until the fluid pressure in accumulator 30 is raised to release the spring brakes 24.

When the engine of the vehicle is started, vacuum will be created at the manifold 140. This vacuum will be carried through conduit 172 to be made available at the outlet port 138 of the control valve means 38. Since resilient member 160 maintains face 146 in a seated position over outlet port 138 atmospheric pressure freely flowing through inlet port 136 into chamber 132 through the spidered bearing 148 around seat 180 and out the control port 142 and by way of conduit 174 into the front chamber 48 where resilient member 62 urges the diaphragm means 46 toward the rear chamber 50.

At the same time the pressure mode signal is transmitted to the indicator 34 an electrical energy signal representative of the pressure mode signal will be carried through lead 170 to the first terminal 102 of switching means 36. This electrical energy flows through contact points 108 and 118, bi-metal strip 110, 120 out the second terminal to the coil 152 of the control valve means 38. The electrical energy received by the coil 152 will create a magnetic attraction which will move the plunger 144 overcoming resilient means 160. The plunger 144 will move to unseat face 146 from seating on ribs 166 thus connecting control port 142 with outlet 138 and seat face 147 on the annular projection 180 to close atmospheric pressure communication of the inlet port 136 and the control port 142. In this position, vacuum communicated through outlet port 138 will evacuate the front chamber 48 to create a pressure differential across the wall means 46. This pressure differential acting on wall means 46 will generate a force which will move push rod 64, closing compensating port 76 and pressurize the fluid in the chamber 72 passing through outlet port 74 into supply conduit 28.

Simultaneously with this operation in the pumping device 26, some of the electrical energy flowing through switching means 36 is converted to thermal energy by heating coil 124 resisting the electrical flow. The increase in thermal energy causes the bi-metal strip 110, 120 to expand differently and break the contact points 108, 118 and interrupt the electrical energy flow therethrough. With the flow of electrical energy to coil 152 terminated, resilient member 160 again moves plunger 144 to seat face 146 on ribs 166 closing the outlet port 138 and opening inlet port 134 to allow atmospheric pressure to travel through the control port 142 and into the front chamber 48 of the vacuum pumping device 26. With atmospheric pressure in both chambers 48 and 50, the resilient member 62 will now urge the diaphragm means 46 toward the rear chamber 50 and return the piston 86 to the up stroke position completing a single cycle. As the piston 86 is being returned, compensating port 76 is opened replacing the pressurized fluid transmitted to the accumulator 30. The above cycle is repeated by the temperature sensitive switching means 36 operating the electrically operated control valve means 38 until the pressure mode signal from switch 32 breaks the electrical energy circuit rendering the control valve means 38 inoperative. In the inoperative state, atmospheric pressure is freely communicated to the front 48 and rear 50 chambers of the pumping device 26 to permit the resilient member 62 to hold the piston means 86 at the top of the power stroke in the rest position. At this point, the pressure in the accumulator 30 will have reached a predetermined valve sufficient for the switch 32 to transmit a different pressure mode signal to indicator 34 causing the light to go out. This predetermined pressure available in the supply line 28 will permit the spring brakes to be released in response to the operator controlled inversion valve 12.

As shown in the drawing, inversion valve 12 is in the position with the spring brakes 24 applied. In the applied position, fluid communication from inlet port 170 connected to the accumulator 30 is inhibited by a ball valve 172 being urged against seat 174 by spring 176. Any fluid pressure acting on the spring brakes 24 can now escape through control port 173 through activation stem 180 and out the outlet port 182 to the reservoir 14.

When sufficient fluid pressure has been stored in the accumulator 30, upon moving the activation stem 180, by positioning the manual lever means 184 to the dashed location as shown in the drawing, the ball valve 172 will be unseated. With the activation stem 180 seated on ball valve 172, pressurized fluid flow will pass between the stem 180 and the seat 174 to be communicated through control port 173 to release the spring brake means 24.

In the event that a malfunction should occur in the system with fluid being lost or unavailable at inlet port 78 or vacuum not being produced at manifold 140, the vacuum pumping device 26 would continue to operate but would not change the operational pressure mode in the accumulator 30. By designing the size of the accumulator to permit from two to five manual applications of the spring brakes 24 would permit the operator to move a vehicle from the roadway to a shoulder and out of the immediate line of traffic if this type of malfunction should occur. When the fluid in the accumulator is depleted, the spring brakes will be automatically applied. This will prevent movement of the vehicle until the spring brakes are released by fluid pressure or through manual means of a type disclosed in U. S. application Ser. No. 38,088 filed May 18, 1970, now U. S. Pat. No. 3,647,030, owned by the same assignee of this application and incorporated herein by reference. Thus, I have devised a braking system which will operate independently of the crankshaft power produced to effectively produce sufficient energy to maintain an emergency or parking brake system.

I claim:

1. In a power braking system having a fluid operated spring brake means for use as an emergency and parking brake with pumping means for supplying fluid under pressure to control the operation of said spring brake means, said pumping means comprising:
    a housing having an internal cavity;
    wall means dividing said cavity into a front chamber and a rear chamber, said rear chamber being continually subjected to atmospheric pressure;
    a cylinder having a stepped bore with an inlet port and an outlet port, said inlet port being connected to a reservoir containing said fluid, said outlet port being connected by a conduit to said spring brake means;
    piston means located in said stepped bore of the cylinder and connected to said wall means;
    resilient means located in said front chamber for urging said wall means toward said rear chamber; and
    electrical control means responsive to the pressure of the fluid in said conduit for alternately permitting vacuum and atmospheric pressure to said front chamber to create a pressure differential across said wall means causing said piston means to reciprocate in said bore and pressurize the fluid admitted to said cylinder through said inlet by forcing the fluid through said outlet and into the conduit to provide the operating fluid force for said spring brake means.

2. The power braking system, as recited in claim 1 including:
    means responsive to the fluid pressure being supplied to said spring brake means for transmitting a signal to an indicator device and said electrical control means representing the intensity of the pressure mode existing in the supply conduit.

3. The power braking system, as recited in claim 2 wherein said electrical control means includes:
    a housing having a chamber with a vacuum port, an atmospheric pressure port and a control port, said control port being connected to the front chamber of the housing of the pumping means;
    electrically operated valve means for alternatively opening and closing said control port to said vacuum port and said atmospheric pressure port causing said pressure differential across the wall means; and
    switching means connected to said electrically operated valve means for receiving said pressure mode signal to sequentially energize said electrically operated valve means.

4. The power braking system, as recited in claim 3 wherein said switching means includes:
    first means for receiving electrical energy representing said pressure mode signal;
    second means for transmitting electrical energy to said electrically operated valve means in a predetermined time sequence;
    a first strip of metal attached to said second means and in contact with said first means, said contact permitting electrical energy to flow from said first means to said second means;
    heating means operated by the flow of electrical energy through said first strip of metal, said heating means raising the temperature of the metals, said first strip of metal expanding when subjected to said temperature change causing the contact between said first strip of metal and said first means to be broken and interrupting the flow of electrical energy therebetween, said interrupted energy flow to said heating means permitting the temperature of the dissimilar metals to be lowered to allow contact between said first strip of metal and said first means.

5. The power braking system, as recited in claim 4 wherein said electrically operated valve means includes:
    a shaft located in the chamber with a face on one end overlying said vacuum port, the other end of the shaft extending through a bearing wall in the housing;
    resilient means secured to said shaft for urging said face into a seating position with said vacuum port to prevent communication therethrough; and
    coil means surrounding said other end of the shaft connected to the second means of the switching means for overcoming the force of said resilient means to allow communication through the vacuum port in response to the flow of electrical energy from said second means.

6. The power braking system as recited in claim 5 further including:
    flow control means in the supply conduit adjacent the outlet port of the cylinder for preventing backflow of fluid through the bore of the cylinder.

7. The power braking system as recited in claim 6, further including:
    means connected to the supply conduit downstream from the flow control means for storing a supply of fluid under pressure sufficient to permit a series of spring brake releases without the pumping means being energized.

8. The power braking system as recited in claim 7 further including:
    actuating means connected to the supply means responsive to an operator for permitting fluid under pressure to release said spring brake means.

9. The power braking system as recited in claim 2, wherein said electrical control means includes:
    a housing having a control chamber connected to the front chamber of the pumping means, said control chamber being in communication with a source of vacuum and atmospheric pressures;

means responsive to temperature change for interrupting the electrical energy flow representing the pressure mode signal; and solenoid operated valve means secured to the housing and controlled by said interrupted electrical energy flow for sequentially subjecting said control chamber with vacuum and atmospheric pressure to create pulsating fluid flow to said front chamber of the pumping means.

10. The power braking system as recited in claim 9, wherein said temperature responsive means includes:

a first terminal connected in parallel with and receiving the same electrical signal as the indicator device informing the operator of the fluid pressure mode;

a second terminal connected to an electrical coil of the solenoid operated valve means;

a bimetal strip connected to said second terminal and biased into contact with said first terminal; and a heating coil connected to said second terminal and adjacent said bimetal strip, said heating coil being operated by the electrical energy flow between said first and second terminals, said heating coil connecting electrical energy to thermal energy causing the bimetal strip to expand non-uniformily overcoming the biasing contact with said first terminal and stopping the electrical energy flow between the first and second terminals to interrupt the conversion of electrical to thermal energy, said bimetal strip upon cooling returning to biased contact with said first terminal permitting continued electrical flow.

* * * * *